Sept. 7, 1943.   F. E. DOMKE   2,328,712
CORK CUTTING MACHINE
Filed Dec. 31, 1940   7 Sheets-Sheet 1
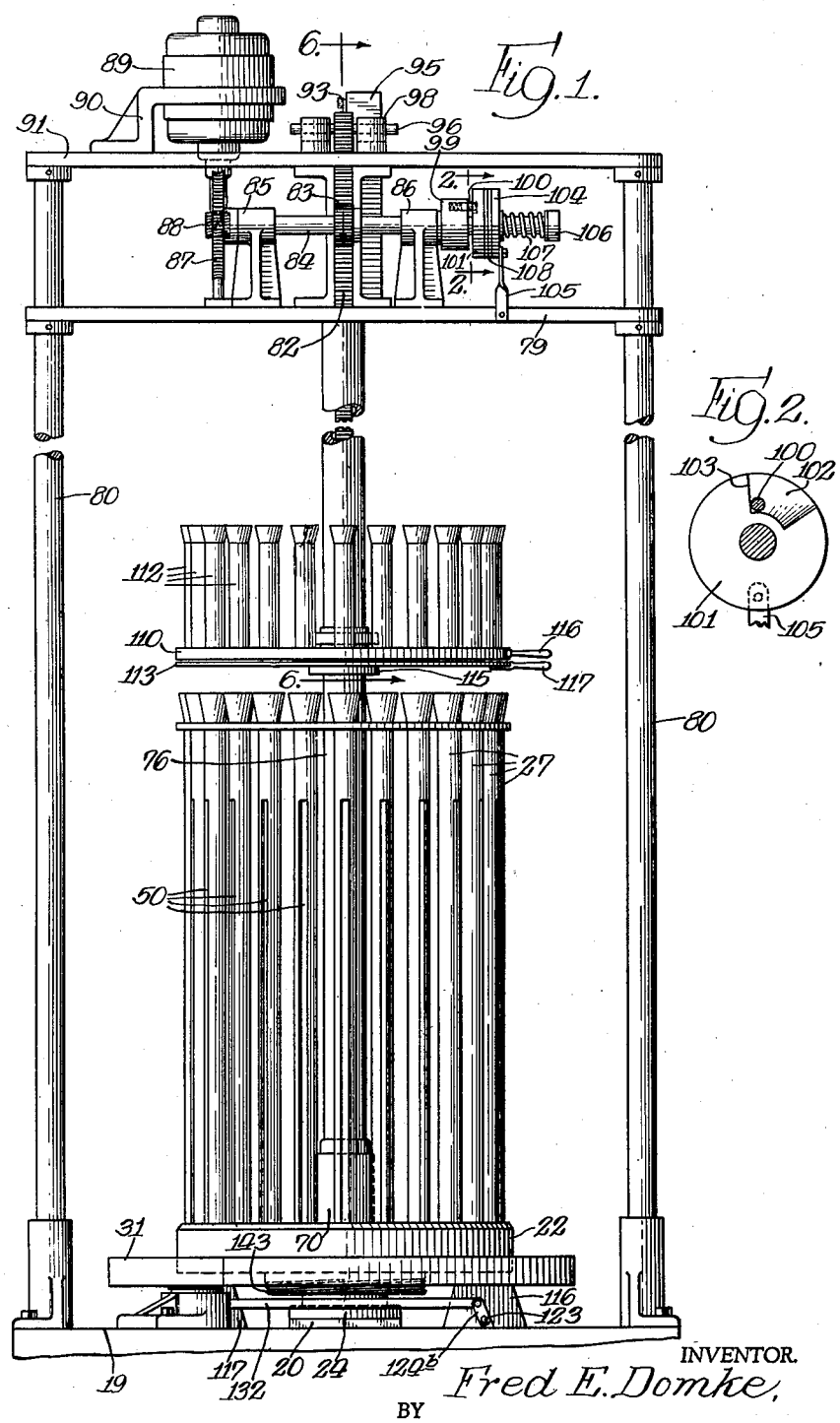
INVENTOR.
Fred E. Domke,
BY
Davis, Lindsey, Smith & Shonts Attys.

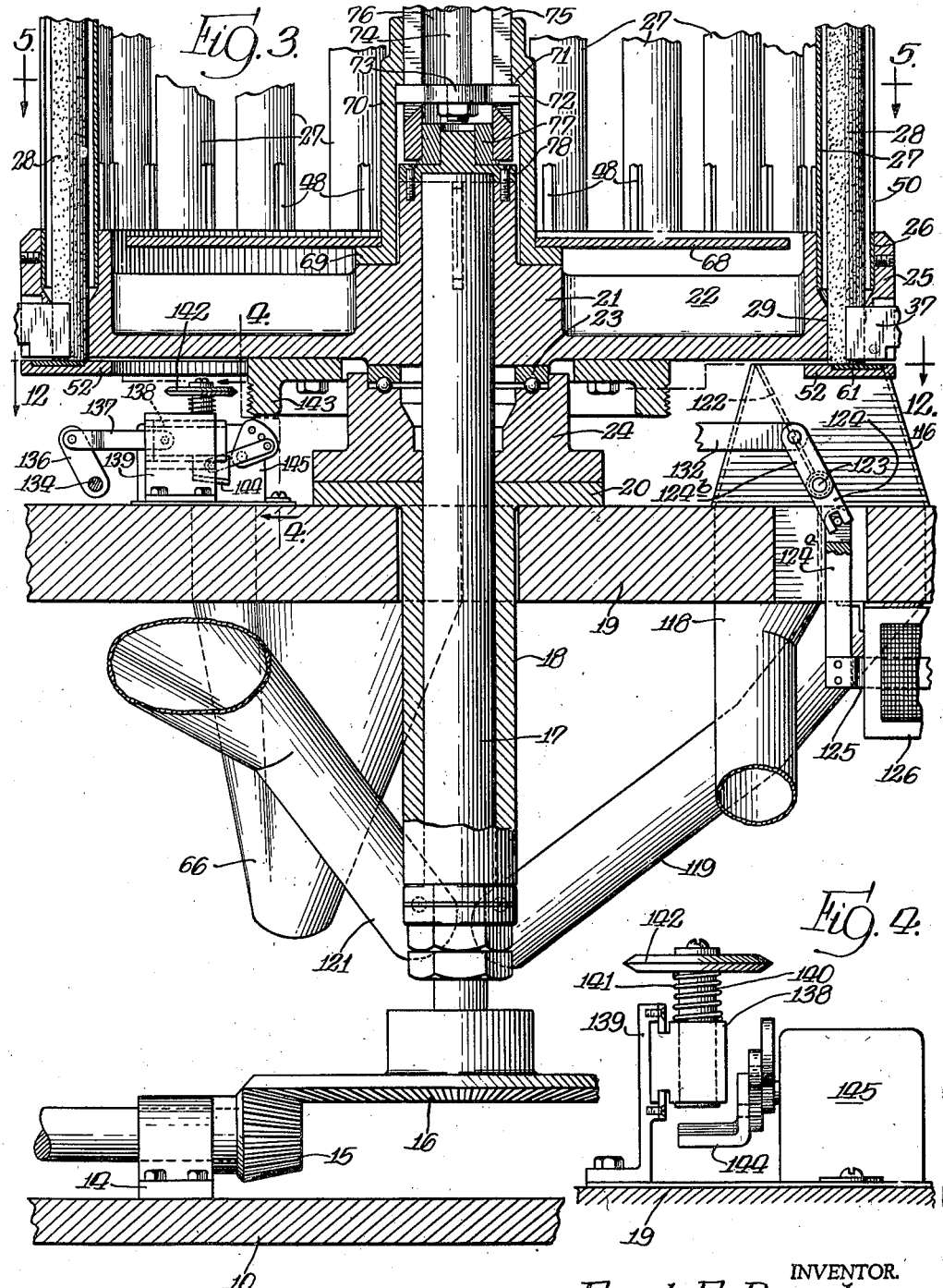

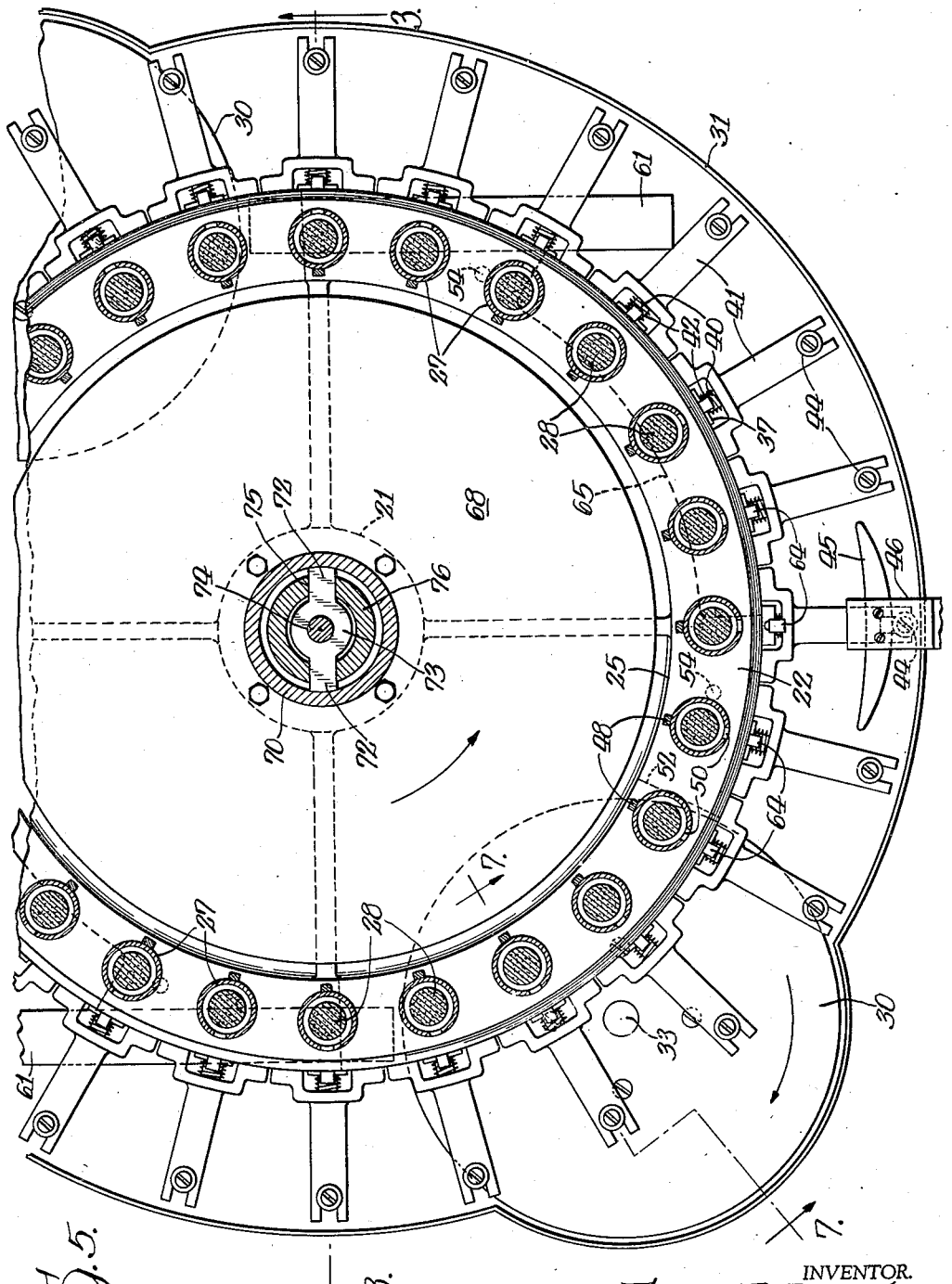

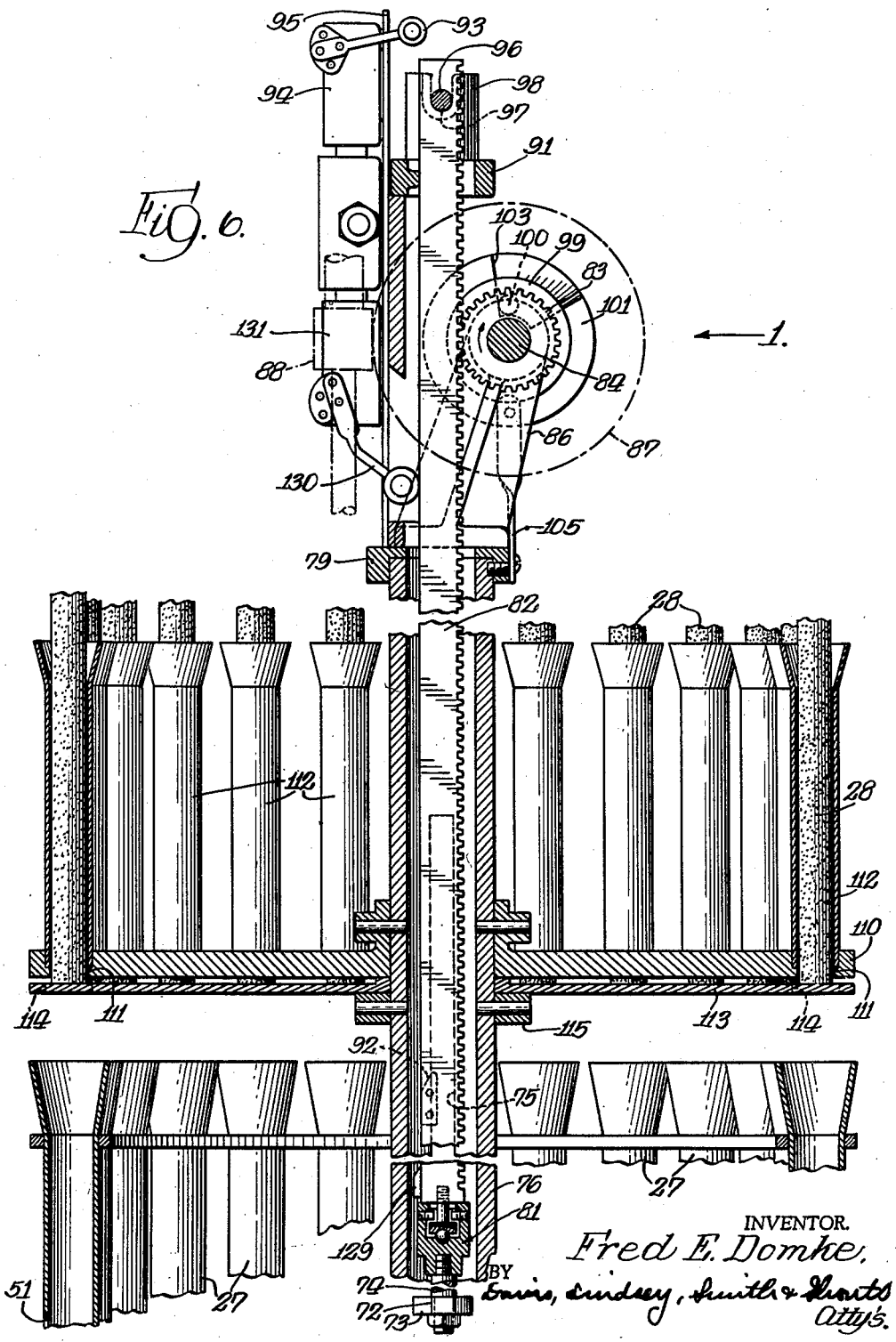

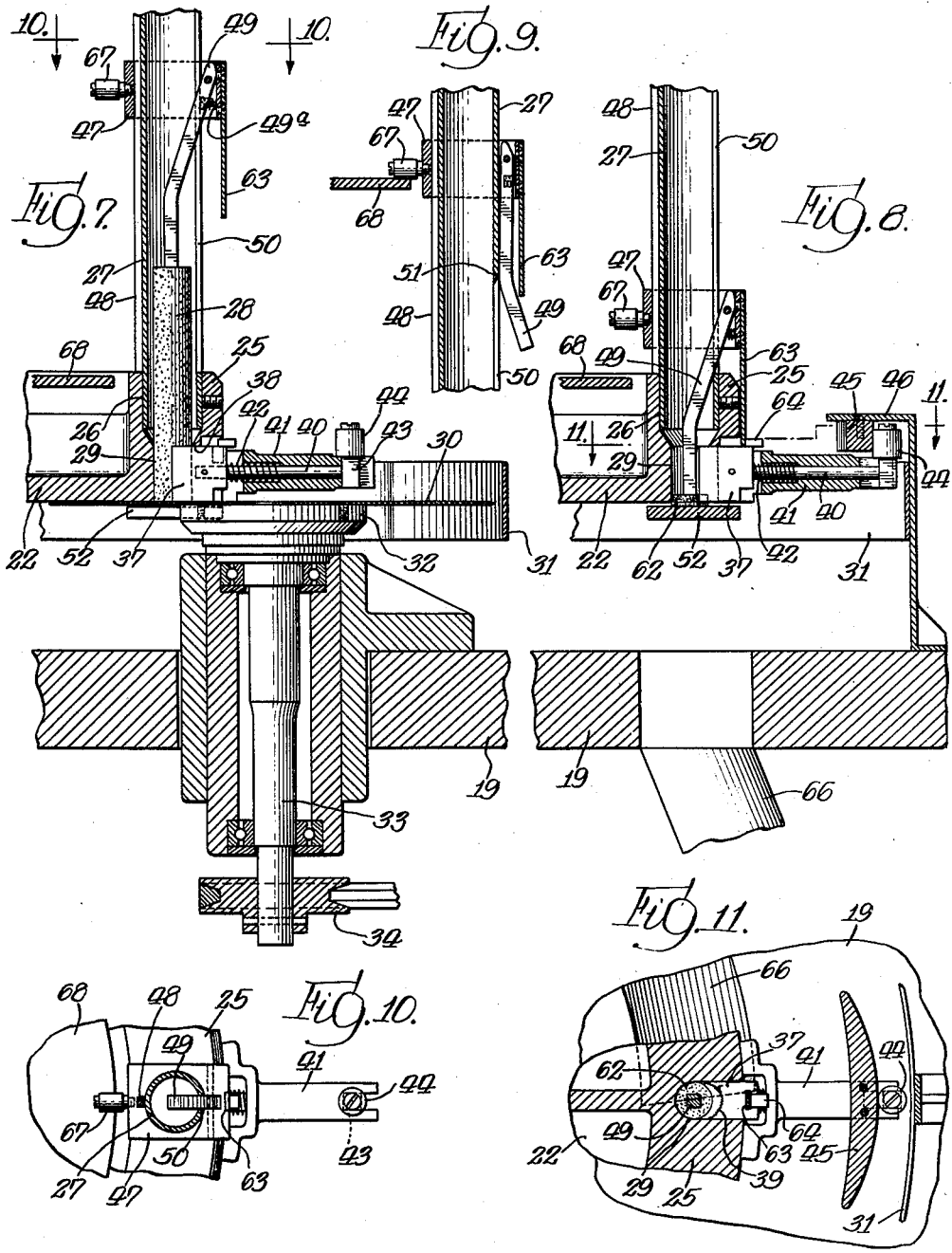

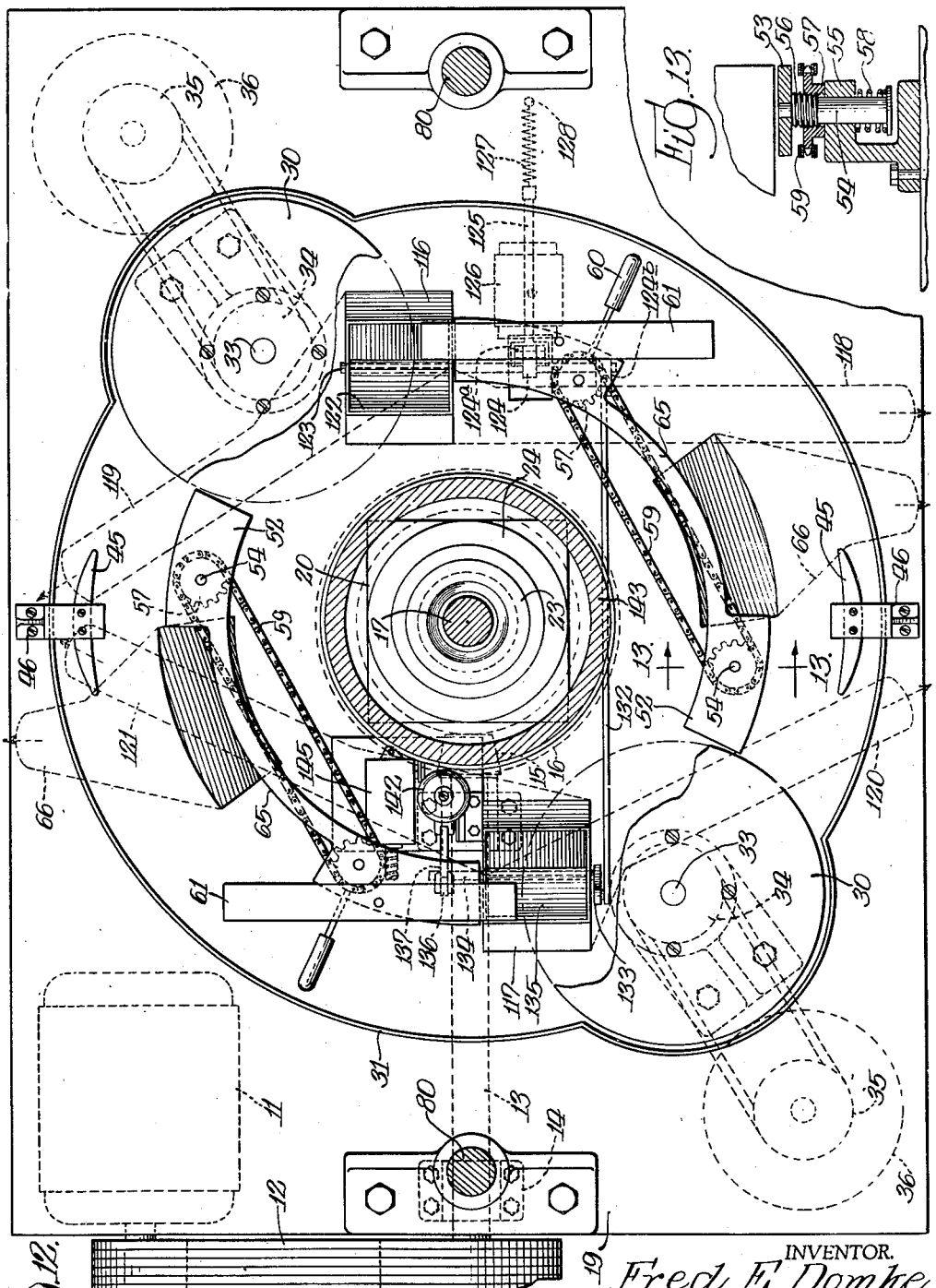

Sept. 7, 1943. F. E. DOMKE 2,328,712
CORK CUTTING MACHINE
Filed Dec. 31, 1940 7 Sheets-Sheet 7
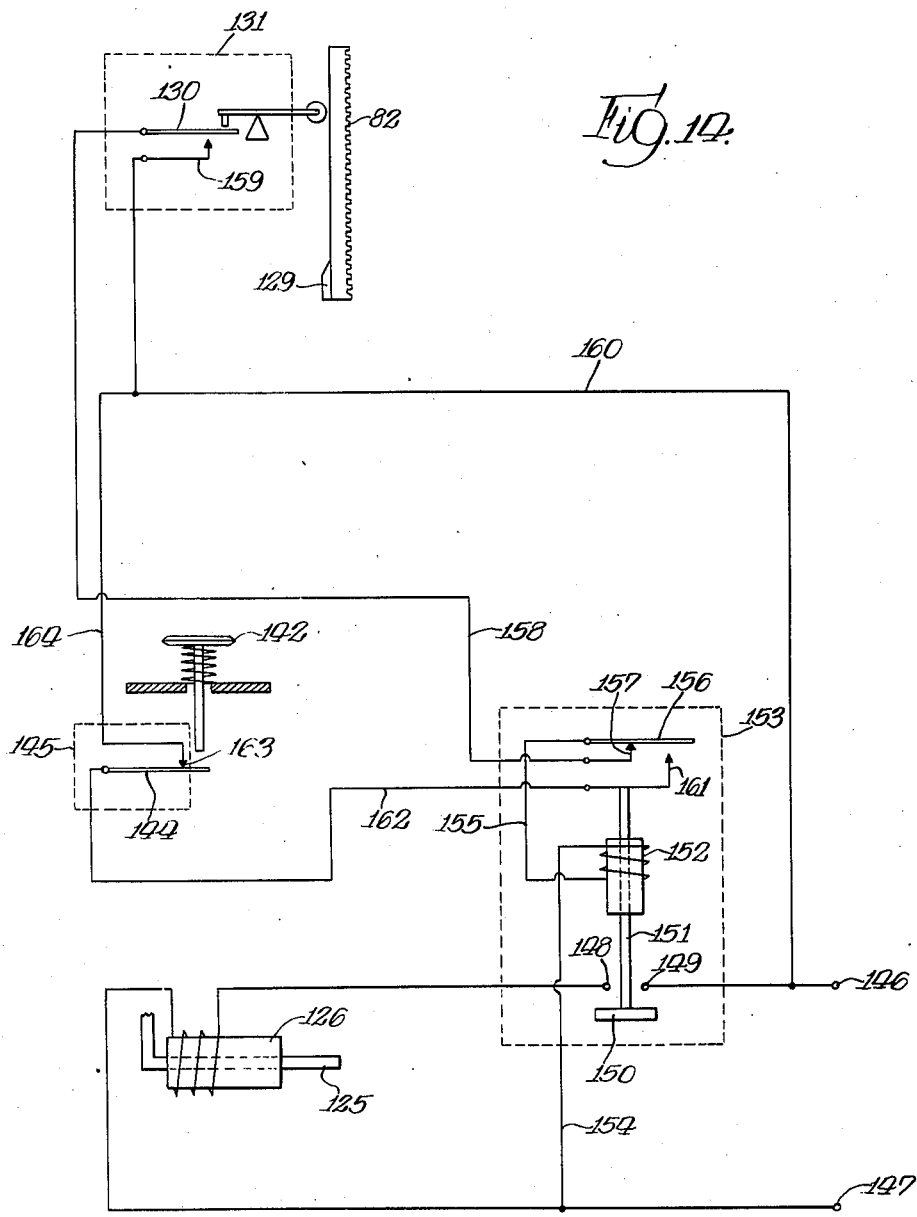
INVENTOR.
Fred E. Domke,
BY
Davis, Audrey, Smith & Short Attys Patented Sept. 7, 1943

2,328,712

UNITED STATES PATENT OFFICE 2,328,712

CORK-CUTTING MACHINE

Fred E. Domke, Chicago, Ill., assignor to W. H. Hutchinson & Son, Inc., Chicago, Ill. a corporation of Illinois Application December 31, 1940, Serial No. 372,625

12 Claims. (Cl. 144—21)

My invention relates to machines for cutting cork rods into disks of the type customarily employed as seals in metal closures of the so-called "crown" type.

My machine is similar to previous machines in that it comprises a rotary turret having a plurality of vertical holder tubes for receiving the cork rods that are made from compressed particles of cork, but is an improvement thereover in that it incorporates a number of features designed to increase the rate of production of the disks, reduce wastage of cork by cutting a maximum number of disks from each cork rod, and to generally produce a superior disk that is characterized by a high degree of uniformity as between separate disks and of uniform thickness in each disk.

Heretofore, it has been necessary to manually insert each rod in its tube which requires a stoppage of the machine. As these machines may have as many as forty tubes or more, the loss in production during a working day is considerable, this delay increasing the unit cost of each disk which is an important factor in view of the highly competitive market in which these articles are sold.

An additional objection to previous machines resides in the manner in which the rods are held relative to the knife during the cutting operation. The lower end of the rod extends through an opening in the turret and the cutting pressure of the knife is opposed by the wall of the opening whose diameter necessarily must be sufficiently large to insure a free movement of the rod under the impelling action of a weight. This relatively insecure holding of the rod during cutting results in non-uniformity of product and a considerable wastage due to the necessity of stopping the cutting while a considerable length of stump still remains. This stump must be reground and repressed with other cork to make new rods.

Other objections are concerned generally with the production rate of disks and will become more apparent hereinafter by comparison with the operating advantages of my improved machine.

It is, therefore, one object of my invention to devise a cork-cutting machine in which the holder tubes are simultaneously charged with rods at the end of each cutting operation.

A further object is to devise a machine of the character indicated which embodies magazines tubes equal in number to the holder tubes and which during the cutting of the rods in the holder tubes are charged with fresh rods which are subsequently and simultaneously discharged by gravity into the holder tubes, thus materially reducing the charging time of the machine.

A further object is to provide a cork-cutting machine having the usual weights for shifting the rods as they are cut, which weights, in addition to being simultaneously raised from contact with the rod stumps at the end of the cutting operation, are automatically shifted to a clear position without the holder tubes to permit a free entrance of a fresh set of rods, and thereafter simultaneously released for independently applying pressure to the new rods.

A further object is to provide mechanism for automatically controlling and separately collecting the initial cuts from the lower ends of fresh rods, which is required because many of these ends are irregularly formed and the thickness of each finished disk must be uniform and its opposite surfaces smooth, and thereafter separately collecting the finished disks.

A further object is to provide clamping mechanism for holding the lower ends of the rods during cutting which is periodically released to permit the weights to shift the rods to new positions, and which is finally held open to permit the discharge of the stumps.

Further and more specific objects are to devise mechanism for varying the thickness of the disks and generally to provide a cork-cutting machine in which manual operations are reduced to the opening and closing of switches, the charging of the magazine tubes, and the alignment of the latter with the holder tubes.

These and further objects of my invention will be set forth in the following specification, reference being had to the accompanying drawings, and the novel means by which said objects are effectuated will be definitely pointed out in the claims.

In the drawings:

Figure 1 is an elevation of my improved machine looking in the direction of the arrow I in Fig. 6, certain parts, such as the collars which are connected to the weights, being omitted for the sake of clearness.

Fig. 2 is an enlarged section along the line 2—2 in Fig. 1 showing a clutching detail forming part of the weight-raising mechanism.

Fig. 3 is an enlarged section of the lower portion of the turret taken along the line 3—3 in Fig. 5 and showing the conduits into which are respectively discharged the initial reject disks cut from the lower ends of the rods, the finished disks, and the stump portions of the upper ends of the rods, together with certain mechanism for controlling the discharge of the finished and initial disks.

Fig. 4 is an enlarged view along the line 4—4 in Fig. 3, showing a portion of the automatic mechanism for controlling the last-noted division of the finished and initial disks.

Fig. 5 is an enlarged section taken along the line 5—5 in Fig. 3, showing the circular arrangement of the cork-holder tubes and a portion of the clamps for individually gripping the lower ends of the cork rods.

Fig. 6 is an enlarged section along the line 6—6 in Fig. 1, showing the arrangement of the magazine tubes which are charged with fresh cork rods while the rods in the holder tubes are being cut, and also a part of the mechanism for raising the rod weights.

Fig. 7 is a sectional elevation along the line 7—7 in Fig. 5, showing a cork rod after severance of a disk and the weight resting thereon.

Fig. 8 is a section similar to Fig. 7, but showing a cork rod after severance of the maximum number of disks and the weight in its lowermost position and holding the rod gripping jaw in retracted position to thereby permit a discharge of the upper or stump portion of the cork rod.

Fig. 9 is a fragmentary section showing the cork weight raised to its uppermost position, and one in which it has been shifted clear of the interior of the holder tube to permit an insertion of a fresh cork rod.

Figs. 10 and 11 are sections along the lines 10—10 and 11—11, respectively, in Figs. 7 and 8.

Fig. 12 is a section along the line 12—12 in Fig. 3 showing certain control mechanism and the knives which are disposed beneath the turret.

Fig. 13 is a section along the line 13—13 in Fig. 12, showing a portion of the mechanism for varying the elevation of the stop plate which engages the lower ends of the cork rods to determine the thickness of the disks to be cut.

Fig. 14 is a diagrammatic electrical circuit showing the devices for automatically controlling the direction of the initial reject disks into one discharge conduit and the finished disks into another.

Referring to Figs. 1, 3 and 12, the numeral 10 designates the bedplate of the machine which supports a principal driving motor 11 that is connected through a chain 12 with a shaft 13 journaled in bearings 14—14 on the bedplate. A pinion 15 is secured to the shaft 13 and meshes with a bevel gear 16 fast on the lower end of a vertical shaft 17 which is journaled in a sleeve 18 that extends downwardly through a suitable opening provided in a table 19 and has its upper end flanged, as at 20, for support on the upper surface of the table.

The upper end of the shaft 17 is keyed or otherwise secured to the hub 21 of a rotary turret 22, and the weight of this turret and its associated features is supported on a bearing ring 23 carried by a spacer 24 that rests on the flange 20. The turret 22 is provided with a thick, peripheral wall 25, which is provided with a plurality of equispaced and circularly arranged sockets 26 for receiving the lower ends of holder tubes 27 that extend vertically upward from the turret and into which are inserted, as hereinafter described, cork rods 28. The internal diameter of the tubes 27 is slightly greater than the diameter of the cork rods 28, in order to facilitate their free and rapid insertion into the tubes, while the lower end of each socket 26 is reduced in diameter to form a passage 29 whose radius is substantially equal to the radius of a cork rod.

As the turret 22 is rotated in a counterclockwise direction, the lower ends of each cork rod are successively presented to rotary knives 30, of which two are preferably employed and located at opposite ends of a diameter of the turret, in order to increase the capacity of the machine (see Fig. 5).

As indicated in Fig. 7, each knife 30 is a thin disk and is positioned close to the under surface of the turret and, as a safety feature, a guard rail 31 may extend completely around the machine, including that portion of each knife which extends beyond the turret, and this rail may be suitably supported on the table 19. Each knife 30 is secured to a head 32 that is fast on a shaft 33 which extends downwardly through and is journaled in the table 19. A pulley 34 is secured to the lower end of the shaft 33 and is belt driven by a similar pulley 35 provided on the shaft of a motor 36 (see Fig. 12) which may be appropriately mounted on the under side of the table 19, or on the bedplate, as desired. A separate motor is provided to drive each knife and it will be understood that these motors are suitably connected, in a manner not shown, so as to be capable of operation by a single switch.

The cutting action of the knives 30 exercises a certain thrust against the lower end of each cork rod and, in order to securely hold the rod against this pressure so that a uniform and accurate disk will be produced, I employ a special form of clamping mechanism which comprises a jaw 37, one for each cork rod, which extends through an opening 38 in the wall 25 and has its inner end 39 shaped to a curvature that will conform to the periphery of the cork rod, and this surface may be roughened or otherwise conditioned to secure an effective clamping pressure on one side of the rod, it being understood that the rod is clamped against the adjacent surface of the passage 29. The jaw 37 is arranged for radial action with respect to the axis of the turret and is provided with an arm 40 whose inner end is secured to the jaw and is slidably mounted in a bracket 41 attached to the wall 25.

A coil spring 42 encircles the arm 40 within the bracket 41, one end bearing against an internal shoulder provided in the bracket, and the opposite end against the jaw 37 so that the latter is normally urged into engagement with the cork rod. The outer end of the arm 40 extends beyond the bracket 41 and has attached thereto a vertical stub shaft 43 whose upper end has journaled thereon a roller 44. Periodically, during the rotation of the turret, and after each severance of a cork disk by either knife 30, the roller 44 rides over a segmental cam 45 (see Figs. 5, 8 and 11), this cam being carried by a bracket 46 supported on the table 19. Two of these cams are provided and they are located at opposite ends of a diameter of the turret. The shape of the cam surface is such that it provides for a temporary retraction of each jaw 37 so that the cork rod can be advanced to a new cutting position by mechanism which will now be described.

Referring to Figs. 5 and 7, the advancement of each cork rod after a disk has been cut from the lower end thereof, and during the retracted period of the jaws 37, is effected by means of a freely acting weight which comprises a collar 41 that is slidable along each holder tube 27 and is guided thereon through the medium of an outside rib 48 that extends lengthwise of the tube and fits within an appropriate recess provided in the collar 47. Preferably, these ribs are secured to that surface of each tube which is closest to the axis of the turret. On the opposite side of each tube, the collar 47 is offset as indicated in Fig. 7, and pivotally mounted within this offset is the upper end of a weight arm 49 that extends through a longitudinal slot 50 into the interior of the tube for engagement with the upper end of the cork rod. The arm is maintained within the tube by the extending action of a spring 49a interposed between the arm and collar. As indicated in Figs. 1 and 9, the slot 50 extends from the turret 22 upwardly to a point short of the upper end of the tube and the upper end of the slot is defined by an inclined cam surface 51, for a purpose presently explained.

The thickness of the severed disks is determined by limiting the downward advance of the cork rods under the impulse of the weights 49, and this limit is provided by means of a parti-annular plate 52, of which two are provided, one being located on each side of the machine between the knives. As shown in Fig. 12, each plate 52 extends in the direction of rotation of the turret from a point close to one knife 30, but terminates at a greater distance from the following knife, the gap therebetween being filled by a part presently explained. In order to vary the distance of the plate 52 from the lower surface of the turret, I support each plate upon a pair of posts 54 which are disposed adjacent the ends thereof and which depend downwardly for slidable mounting in a bracket 55 carried by the table 19. The portion of each post 54 between the plate 52 and the upper surface of the bracket 55 is threaded as at 56 to receive a sprocket 57 which operates generally as a nut. The sprocket is maintained in contact with the top surface of the bracket 54 by means of a coil spring 58 that encircles the post 54 below the bracket, one end of the coil abutting the bracket and the opposite end a shoulder provided on the lower end of the post. A chain 59 connects the pair of sprockets 57 and one of the latter may have secured thereto an appropriate handle 60 whereby the entire plate 52, when the handle 60 is actuated in either direction, may be elevated or lowered as desired, with a certainty that all portions of the top surface of the plate 52 will always remain in parallel relation to the under surface of the turret.

In the operation of the machine, it becomes necessary, from time to time, to resharpen the knives 30. This grinding results in a gradual reduction in the diameter of each knife, and, in order to bridge the gap between that end of each plate 50 which is adjacent the cutting edge of the knife, a slide plate 61 is mounted in a recess provided in the plate 52 and one end thereof may be moved into close proximity to the edge of the knife and shifted from time to time as the diameter of the knife is reduced by sharpening. This plate provides a confining restraint on the lower end of each cord rod during cutting and is a factor in the production of uniformly thick and smooth surface disks.

As the cork rods are successively severed and successively moved to new severing positions by the weights, the rods are gradually shortened until the remaining portions thereof are so short that they cannot be effectively held during the cutting operation. One of the principal advantages of my machine resides in the fact that I am able to materially reduce the cork wastage by cutting a maximum number of usable disks out of each cork rod. This result is primarily due to the novel clamping mechanism which enables each rod to be securely held for successive disk severings until a stump 62 having a length only of from ¼" to ⅜" remains. This stump is discharged into an appropriate conduit, as presently described, for subsequent regrinding and repressing into new cork rods.

The parts of the machine are so related that when each cork rod has been severed to a stump having a length of the order indicated, the collar 47 will occupy the position illustrated in Fig. 8, with the weight arm 49 resting on the rod stump 62 and a latch plate 63 carried by the collar 47 engaging with a latch block 64 provided on the clamping jaw 37 to prevent a restoring of the jaw to clamping position after the cam 45 has been traversed by the roller 44.

Evacuation of the stump 62 is secured by reducing the width of each plate 52 between the ends thereof, as indicated by the segment 65 in Figs. 5 and 12, this reduction beginning generally opposite each cam 45 and continuing in the direction of rotation of the turret for a predetermined distance, but terminating short of the recess which receives the adjustment plate 61. As clearly shown in the figures just noted, the width of the narrowed segment of the plate 52 is such as to engage with only a limited portion, preferably less than one-eighth, of the lower end of each cork rod as it is passed thereover, the inner portions of the rod ends resting on the narrowed segment and the extent of the area contacted being such that, when the cork rods have a length greater than that of the rod stump 62, the rod will still be supported by the segment 65, even while the jaws 37 are retracted. However, when the rods have been severed until only the rod stump 62 remains, then when each clamp is successively retracted by engagement with a cam 45, the stump, owing to the fact that its length is considerably less than the height of the opening 38 through which the jaw 37 operates, tilts on the outer edge of the segment 65 and is discharged through conduit 66 (see Figs. 3 and 12). This action is also facilitated by centrifugal force arising from the rotation of the turret.

Eventually, all of the weight collars 47 reach the position illustrated in Fig. 8 and all of the rod stumps 62 are discharged in the manner above described. The operator of the machine can observe this condition from the fact that no more finished disks are being discharged by the machine, so that the holder tubes 27 can now be recharged with a set of fresh rods. At this time, the operator preferably shuts off the driving motor 11, since it is necessary that the turret 22 be at rest during charging with the fresh rods.

However, before the tubes 27 can receive new cork rods, the weight arms 49 must first be moved clear of the tubes and the mechanism for securing this result will now be described. As shown in Fig. 7, each collar 47 has journaled thereon a roller 67 which extends radially inward therefrom and all of the collar rollers are intended to be engaged by a lifter plate 68 which, during the normal cutting operation of the machine, occupies its lowermost position as illustrated in Fig. 3. The plate 68 is secured to the flanged lower end 69 of a sleeve 70 that is concentric with the axis of the turret 22. The sleeve 70 is provided with an internal, annular shoulder 71 that is engaged, during the lifting operation, by the oppositely extending wings 72 of a yoke 73 secured to the lower end of a lifting rod 74 that is also coaxial with the turret. The wings 72 extend through and are guided during the lifting and descending movements by oppositely disposed slots 75 which extend lengthwise of a tube 76 whose lower end rests on and is held transversely by a shouldered bushing 77 mounted on a cap 78 that is secured to the upper end of the hub 22 on driving shaft 17, while the upper end of the tube is secured to a horizontal strut 79 bridged between and supported by a pair of standards 80 that extend upwardly from the table 19.

At an appropriate distance above the turret, the upper end of the lifter rod 74 is connected by means of a universal unit, generally indicated by the numeral 81, to the lower end of a rack 82. This rack meshes with a rack pinion 83 (see Figs. 1 and 6) secured to a shaft 84 journaled in a pair of brackets 85 and 86 that are carried by the strut 79. Adjacent the bracket 85, a worm gear 87 is secured to the shaft 84 and this gear meshes with a worm 88 secured to the shaft of a motor 89.

The motor 89 may be supported by a bracket 90 on an upper strut 91 that is also bridged between the standards 80 and the circuit through the motor is normally completed by a switch (not shown) under the control of the operator who normally is located to observe disks being discharged from the machine. Provision is made for automatically interrupting the circuit through the motor 89 when the rack 82 has reached its uppermost position and this result is obtained by means of a cam 92 (see Fig. 6) on the side of the rack which moves a switch arm 93 to open-circuit position. This switch arm forms part of a switch box 94 mounted on a support 95 that extends between the struts 79 and 91. As soon as the circuit through the motor is interrupted, the rack 82 and its associated parts are free to descend under the action of gravity and this downward movement is limited by engagement of a stop pin 96 whose intermediate portion is secured to the upper end of the rack 82 and whose ends are received within U-shaped sockets 97 provided in a pair of stop blocks 98 carried by the strut 91. These sockets may be cushioned in any desired manner against the shock of stopping.

In order to retard the speed of the downward movement of the rack 82, I may employ the braking mechanism illustrated in Figs. 1 and 2. This mechanism comprises a collar 99 secured on the shaft 84 to the right of the bracket 86, and which carries a spring-actuated and slidably mounted clutch pin 100 that projects from the right face of the collar. The pin slides over the left face of a brake disk 101 that is loosely mounted on the shaft 84 and which face includes a clutch notch 102, the left end of which, as shown in Fig. 2, is defined by a transverse shoulder 103, while the opposite end merges smoothly into the left face of the disk.

Accordingly, when the shaft 84 is rotating in a clockwise direction, as viewed in Figs. 2 and 6, the pin 100 merely slides across the left face of the disk 101 without imparting any rotation thereto, but when the shaft is rotating in the opposite direction, i. e., during the descending movement of the rack 82, the pin 100 engages the shoulder 103 so that the disk 101 rotates with the collar 99. The brake disk 101 cooperates with a similar disk 104 loosely journaled on the shaft 84 and held against rotation by means of an arm 105, one end of which is secured to the disk 104 and the opposite end to the strut 79. The shaft 84 extends beyond the disk 104 and at its right extremity carries a collar 106, and, between this collar and the adjacent face of the disk 104, a coil spring 107 encircles the shaft and exerts a constant pressure against the disk 104. Opposed faces of the disks 101 and 104 may be provided with any suitable friction material 108.

One of the most important advantages of my improved machine resides in the elimination of the heretofore time-consuming operation of individually inserting fresh cork rods in the holder tubes 27, thus materially increasing the productivity of the machine. For this purpose, I employ a magazine which is loaded during the cutting of the previous set of rods and which fresh rods are simultaneously discharged into the holder tubes upon the completion of the previous cutting. This magazine comprises a plate 110 that is fixed to the tube 76 above the upper ends of the holder tubes 27. A plurality of equispaced and circularly arranged apertures 111 is provided in the disk 110, the arrangement and spacing of these apertures being identical with that of the holder tubes to the end that when the apertures and tubes are brought into registering relation, as hereinafter described, the cork rods in the magazine will fall by gravity into the holder tubes. Each aperture 111 is shouldered within the plate 110 to receive the lower end of a magazine tube 112 that projects above the plate 110 a sufficient distance to adequately support a cork rod. The discharge side of the apertures 111 are closed or opened by a rotary gate plate 113 that is journaled on the tube 76 below the plate 110 and which includes a plurality of apertures 114 which are arranged in the same manner as the apertures 111, the plate 113 being supported against axial movement by a collar 115 that is secured to the tube 76. The circumferential distance between adjacent edges of a pair of apertures 114 is such that, when the gate plate 113 occupies a position in which it masks the apertures 111, the plate 113 acts as a support for cork rods inserted in the magazine tubes 112, and, when the plate 113 is moved to register its apertures 114 with the apertures 111, the new cork rods will drop by gravity into the holder tubes 27 when the latter are registered. Registration of the apertures 111 and 114 is quickly effected by the operator vertically aligning a pair of handles 116 and 117 secured, respectively, to the plates 110 and 113, while the tubes 27 are registered by manually rotating the turret 22.

Due to the fact that the ends of the cork rods as initially made are not smooth enough to serve as seals in a crown, it is necessary to make one or more initial cuts from the lower ends of the rods as inserted in the holder tubes, so that both sides of the disks will be smooth and uniform. These initial or rough disks constitute rejects which must be reground with other material to form new rods, and my improved machine is arranged to automatically discard these disks and when a sufficient cutting has been made from the lower ends of the several rods, as determined by the setting of the machine, the finished disks are automatically discharged into an appropriate conduit.

Referring to Figs. 3, 4 and 12, open-top hoppers 116 and 117 are mounted on the table 19 adjacent the cutting edge of each knife, this edge being regarded as the one towards which the cork rods are carried by the rotation of the turret 22. The hopper 116 is arranged to deliver the initial reject disks into a conduit 118 or the finished disks into a conduit 119, while the hopper 117 is operatively associated, respectively, with similar conduits 120 and 121 (see Fig. 12).

A gate 122 is fixed within the hopper 116 to a shaft 123 that is journaled in a pair of the opposite side walls of the hopper, one end of the shaft extending without the hopper for securement to a lever 124. This lever, as viewed in Fig. 3, is pivotally connected to the upper end of an arm 124a that extends downwardly through an appropriate opening in the table 19 for fixed attachment to one end of the core 125 of a solenoid 126. As shown in Figs. 3 and 12, the solenoid is not energized and the core 125 is maintained by a coil spring 127 in the retracted position shown, i. e., one in which the gate 122 directs finished disks into the conduit 119, one end of the spring being connected to the core and the opposite end to a pin 128 that depends from the table 19. Energization of the solenoid 126, as more particularly described hereinafter, is effected during the upward movement of the rack 82 through the medium of a cam 129 carried by the rack which engages an arm 130 of a normally open switch 131 which may be carried by the bracket 95. For purpose of description, the switch 131 may be regarded as the starting switch of the solenoid circuit.

A rock arm 124b is secured to the shaft 123 and its free end is pivotally connected to one end of a link 132 which extends across the table for pivotal connection to a rock arm 133 that is fast upon a shaft 134 journaled in and extending across the hopper 117 (see Fig. 12). Within the hopper 117, a gate 135, similar to the gate 122, is secured to the shaft 134, so that both gates 122 and 135 are rocked in one direction when the solenoid 126 is energized and in the opposite direction when the solenoid is deenergized by the retracting pull of the spring 127. In the position shown, the gate 135 directs finished disks into the conduit 121.

The shaft 134 extends beyond the hopper 117 for securement to a rock arm 136 that is pivotally connected to one end of a link 137, the opposite end thereof being pivotally secured to a block 138 that is slidable in a bracket 139 carried by the table 19. Journaled for axial movement transversely of the block 138, or vertically, as viewed in Figs. 3 and 4, is a shaft 140 and above the block a coil spring 141 encircles the shaft 140 and normally tends to maintain in the uppermost position illustrated in Figs. 3 and 4 a thin-edged wheel 142 that is fast on the shaft.

When the solenoid 126 is energized, the ensuing movement of the link 132 and connected parts moves the wheel 142 into frictional engagement with the threaded, lateral surface of a ring 143 secured to the under side of the turret 22. Hence, during rotation of the turret, the wheel 142 moves axially of the ring 143 until the lower end of the shaft 140 engages an arm 144 of a normally closed switch 145 that is carried by the table 19. This switch may be regarded as the holding switch of the solenoid circuit as hereinafter described, and, when the arm 144 is actuated by the shaft 140, the switch 145 is opened to deenergize the solenoid 126.

The detailed electrical connections between the solenoid 126 and switches 131 and 145 are more particularly illustrated in Fig. 14. Power terminals 146 and 147, respectively, are connected to a suitable power source and this main circuit includes the solenoid 126, the connection between the terminal 146 and the solenoid being interrupted by a pair of spaced contacts 148 and 149 which are bridged at determined times by an armature 150 carried by the core 151 of a solenoid 152 forming part of a magnetic switch 153. One end of the coil of the solenoid 152 is connected by wire 154 to the negative side of the main solenoid circuit, i. e., the one including the solenoid 126, while the opposite end of the coil 152 is connected a wire 155 to a switch arm 156 also forming part of the magnetic switch 153. In the position of parts illustrated in Fig. 14, the arm 156 engages a contact 157 which is connected by a wire 158 to the starting switch arm 130. Starting switch contact 159 is connected by a wire 160 to the positive side of the main solenoid circuit. The magnetic switch 153 also includes a movable contact 161 which is arranged at determined times to be moved by the core 151 into engagement with the switch arm 156. Contact 161 is connected by wire 162 to the switch arm 144 and contact 163 which is normally engaged by the arm 144 is connected by a wire 164 to the wire 160, so that the switches 131 and 145 are arranged in parallel.

The operation of my improved disk-cutting machine is as follows:

Assuming that the several parts are in the positions illustrated in Figs. 3, 7 and 12, with the turret rotating, the latter continues to advance the several cork rods in succession to the knives 30 and the disks thus severed are discharged into the hoppers 116 and 117 and directed by the gates 122 and 135 into the conduits 119 and 121, respectively. After each severance, each clamping jaw 37 is retracted by the cam 45 to permit the associated cork rod to be advanced to a new cutting position by the weight 49, after which the jaw reengages the lower end of the cork rod prior to the rod being presented to the next knife in order of rotation.

Eventually, each cork rod is cut to a length generally indicated by the numeral 62 in Fig. 8, and, at this time, each latch plate 63, in order of rotation, prevents a return of a jaw 37 to clamping position and thus permits a discharge of the upper or stump end of each rod as it passes over the narrowed segment 65 of one of the plates 52. These stumps are discharged into the conduits 66.

The operator observes when all of the weights have reached their lowermost positions and this condition can be further determined from the fact that the machine is no longer discharging disks. The turret 22 is then brought to a stop by opening the switch to the main motor 11.

During the cutting of the rods in the holder tubes 27, it will be understood that another operator, who may service several machines, has already placed new cork rods in each of the magazine tubes 112, but, before these rods can be discharged into the holder tubes 27, it is first necessary to raise the collars 47 and move the weight arms 49 externally of the tubes. Preferably, this action takes place while the turret 22 is coming to a stop in order to conserve the waiting time of the machine. The operator who observes the discharge of the disks from the machine closes the circuit to the motor 89, whereupon the lifter plate 68 simultaneously raises the collars 47 a distance sufficient to cause each of the weight arms 49 to engage a cam shoulder 51 at the upper end of a slot 50. Further upward movement of the collars rocks the weight arms 49 to the positions externally of the tubes 27 as illustrated in Fig. 9.

The magazine-filling operator thereupon manually rotates the turret by grasping a holder tube until the holder tubes register with the magazine tubes and also registers the handles 116 and 117 whereupon the new cork rods are simultaneously discharged by gravity into the several holder tubes 27.

The timing of the rack 82 during its ascending movement is so arranged that an adequate period is allowed, between the external shifting of the weight arms 49 and the point when the motor switch arm 93 is moved to open-circuit position by the cam 92, in which to feed the new cork rods into the holder tubes. When the circuit through the motor 89 is broken as indicated, the rack 82 and its lifter plate descends under the action of gravity, as slightly retarded by the brake disks 101 and 104 until it reaches its lowermost position as illustrated in Fig. 3. At this time, each of the weight arms 49 is applying pressure to the upper end of the new cork rod.

Before the rack 82 begins its descending movement, however, it will be understood that the cam 129 has actuated the switch arm 130 to close the circuit through the switch 131, this switch being normally open, as indicated in Fig. 14. By reference to the latter figure, it will be noted that the closing of the switch 131 completes the circuit through the magnetic switch solenoid 152, so that the armature 150 bridges the contacts 148 and 149 to thereby energize the solenoid 126.

The solenoid core 125 is thereupon moved towards the left, as viewed in Figs. 3 and 12, and the gates 122 and 135 are rocked in a clockwise direction to direct, when the turret begins rotating, the initial reject cuttings from the lower ends of the cork rod into the conduits 118 and 120. This movement of the gates 122 and 135 is also accompanied by an engagement of the wheel 142 with the threaded periphery of the ring 143.

The operator thereupon starts the rotation of the turret 22, and, as each jaw 37 is retracted in the before-stated manner to permit an advance of each rod to a cutting position, the lower ends of each rod are severed during the rotation of the turret. The number of these initial cuttings can be varied as desired by changing the pitch of the threads on the ring 143, or by varying the initial height of the wheel 142 above the block 138, or both of these expedients may be adopted. Eventually, the wheel 142 is moved downwardly sufficient to engage the switch arm 144 and thereby open the normally closed switch 145. By reference to Fig. 14, it will be clear that, when the switch 131 has been opened by the descending movement of the rack 82, energization of the magnetic switch solenoid 152 and therefore of the solenoid 126 is maintained from that time until the switch 145 is opened because, when the switch 131 was initially closed, the solenoid core 151 engaged contact 161 with the switch arm 156 and at the same time interrupted engagement of the latter with the contact 157.

As soon as the switch 145 is opened in the manner stated, the starting switch 131 already being open, the magnetic switch solenoid 152 is deenergized, whereupon the armature 150 returns to the position illustrated in Fig. 14 and the main solenoid 126 is deenergized. The spring 127 thereupon returns the solenoid coil 125 to the position illustrated in Figs. 3 and 12, accompanied by a shifting of the gates 122 and 135 to the positions illustrated in the same figures where they direct the finished disks into the conduits 119 and 121. Thereafter, the rods are continuously severed until the several collars 47 reach the position illustrated in Fig. 8, whereupon the foregoing operations are repeated.

My improved machine is characterized by a higher disk production during a day's operation in comparison to prior machines. This result is partly due to the use of magazine tubes which may be loaded during the cutting of a previous set of cork rods and thereafter simultaneously discharged into the tubes which hold the rods during cutting. Further reasons for the high production reside in the use of a pair of knives and a novel form of clamping mechanism which enables the turret to be rotated at higher speeds than formerly with assurance that the rods are securely held against the cutting shock of the knives and that the disks will not be deformed. Finally, the fact that the rods can be severed down to stumps of from 1/4" to 3/8" in length not only insures a maximum number of disks from each rod, but also a reduction in the number of fresh rod charges per day and hence a shortening of the total machine waiting time.

I claim:

1. In a machine for cutting disks from cork rods, the combination of a plurality of open ended, vertical holder tubes for individually receiving the rods to be severed, a weight in each tube for advancing the cork rod therein to successive severing positions, means for simultaneously raising said weights, and means for moving said weights laterally and exteriorly of the tubes as they are raised whereby fresh rods may be inserted in the upper ends of the tubes.

2. In a machine for cutting disks from cork rods, the combination of a plurality of open ended, vertical holder tubes for individually receiving the rods to be severed, a weight in each tube for advancing the cork rod therein to successive severing positions, and means for simultaneously raising the weights to a height greater than the initial length of the rods to be cut but less than the height of the tubes, and means for shifting the weights transversely through openings in the tube walls to positions outside of the tubes whereby fresh rods may be inserted in the upper end of the tubes.

3. In a machine for cutting disks from cork rods, the combination of a plurality of open ended, vertical holder tubes for individually receiving the rods to be severed, each tube having a slot extending lengthwise thereof, a collar freely slidable on each tube, a weight in each tube for advancing the cork rod therein to successive severing positions and having a part extending through the slot for pivotal connection to the collar, means engaging the collar for simultaneously raising the weights to a height greater than the initial length of the rod to be cut but less than the height of the tubes, and means for shifting the weights transversely through the respective slots to positions outside of the tubes whereby fresh rods may be inserted in the upper ends of the tubes.

4. In a machine for cutting disks from cork rods, the combination of a plurality of open ended, vertical holder tubes for individually receiving the rods to be severed, each tube having a slot extending lengthwise thereof and terminating short of the upper end of the tube, a collar freely slidable on each tube, a weight in each tube for advancing the cork rod therein to successive severing positions and having a part extending through the slot for pivotal connection to the collar, and means engaging the collar for simultaneously raising the weights to positions above the upper ends of the slots whereby engagement of each weight part with its slot end rocks the weight throught the slot to a position outside the tube to thus permit the insertion of fresh rods in the upper ends of the tubes.

5. In a machine for cutting disks from cork rods, the combination of vertical holder tubes for individually receiving the rods to be severed, a weight in each tube for applying pressure to the cork rod therein, a lifter for simultaneously raising the weights to elevated positions, a motor, devices connecting the motor and lifter and operative to raise the lifter when the motor is running, a switch in the motor circuit, and means associated with one of the devices for automatically opening the switch when the lifter has raised the weights a predetermined distance, the opening of said switch also releasing said lifter to permit it and said weights to thereafter descend under the action of gravity.

6. In a machine for cutting disks from cork rods, the combination of a plurality of vertical holder tubes for individually receiving the rods to be severed, a weight in each tube for applying pressure to the cork rod therein, a lifter for simultaneously raising the weights to elevated positions, a motor, a meshing gear and rack connected to the motor and lifter, respectively, and operative to raise the lifter when the motor is running, a switch in the motor circuit, and cam means on the rack for opening the switch when the lifter has raised the weights a predetermined distance, the opening of said switch also releasing the lifter and weights to thereafter descend under the action of gravity.

7. In a machine for cutting disks from vertical cork rods wherein the rods are successively advanced to a knife and the rods are shifted endwise by weights to new cutting positions, means for simultaneously raising the weights when the rods have been severed to permit the positioning of new rods for cutting, a hopper having a pair of branches, finished disks being discharged into one branch and initial disks from the lower ends of the rods being discharged into the other, a gate for controlling the discharge direction, and means for positioning the gate to first direct a predetermined number of the initial disks into one branch and to thereafter direct finished disks into the other branch.

8. In a machine for cutting disks from vertical cork rods carried by a moving support wherein the rods are successively advanced to a knife and the rods are shifted endwise by weights to new cutting positions, means for simultaneously raising the weights when the rods have been severed to permit the positioning of new rods for cutting, a hopper having a pair of branches, finished disks being discharged into one branch and initial disks from the lower ends of the rods being discharged into the other, a gate for controlling the discharge direction, means responsive to the upward movement of the weight raising means for shifting the gate to direct the initial disks, and means responsive to a predetermined movement of the support for shifting the gate to direct finished disks.

9. In a machine for cutting disks from cork rods supported in vertical tubes carried by a rotary turret which successively advances the rods to a knife and the rods are shifted endwise by weights to new cutting positions, means for simultaneously raising the weights when the rods have been severed to permit the introduction of new rods into the tubes, a hopper having a pair of branches, finished disks being discharged into one branch and initial disks from the lower ends of the rods being discharged into the other, a gate for controlling the direction of discharge, means responsive to the upward movement of the weight raising means for shifting the gate to direct the initial disks, and means responsive to a predetermined number of revolutions of the turret for moving the gate to direct finished disks.

10. In a machine for cutting disks from cork rods supported in vertical tubes on a rotary turret which successively advances the rods to a knife for cutting and the rods are shifted endwise by weights to new cutting positions, means for simultaneously raising the weights when the rods have been severed to permit the introduction of new rods into the tubes, a pair of conduits, finished disks being discharged into one conduit and initial disks from the lower ends of the rods being discharged into the other conduit, a gate for controlling the direction of discharge, a solenoid having its core connected to the gate, means responsive to the upward movement of the weight raising means for energizing the solenoid to move the gate to direct initial disks, and means responsive to a predetermined number of revolutions of the turret for deenergizing the solenoid comprising an externally threaded ring carried by the turret, a thin-edged rotary disk mounted for axial movement and connected to the gate for movement towards and away from the ring, the disk being moved into contact with the threads of the ring when the solenoid is energized, means responsive to the axial movement of the disks after a predetermined number of revolutions of the turret for deenergizing the solenoid, and spring means connected to the solenoid core for shifting the gate to direct the finished disks.

11. In a machine for cutting disks from cork rods supported in vertical tubes on a rotary turret which successively advances the rods to a knife and wherein the rods are shifted endwise by weights to new cutting positions, means for simultaneously raising the weights when the rods have been severed to permit the introduction of new rods into the tubes, a pair of conduits, finished disks being discharged into one conduit and initial disks from the lower ends of said rods being discharged into the other conduit, a gate for controlling the direction of discharge, a solenoid having a core connected to the gate, a starting, normally open switch actuated to closure by the weight raising means and opening when the means descend, a holding, normally closed switch in parallel with the starting switch, magnetic switch means operative to energize the solenoid when the starting switch is closed whereby the gate is shifted to direct the initial disks and also operative through the holding switch to maintain the energization of the solenoid when the starting switch is open, means responsive to a predetermined number of revolutions of the turret to open the holding switch and deenergize the solenoid, and spring means for retracting the solenoid core and for shifting the gate to direct finished disks.

12. In a machine for cutting disks from cork rods, the combination of upright holder tubes for receiving the cork rods to be severed, a weight in each tube for applying pressure to the cork rod therein, a lifter for simultaneously raising all of said weights to elevated positions, power means, a lift member connected to said lifter and adapted to be raised by said power means to raise said lifter, means for controlling said power means, and means on said lift member adapted to actuate said controlling means to cut out said power means when said lift member is raised to a predetermined position, the cut-out of said power means releasing said lifter, lift member and weights for descending movement under the action of gravity.

FRED E. DOMKE.